United States Patent [19]
Young

[11] Patent Number: 5,458,389
[45] Date of Patent: Oct. 17, 1995

[54] DEVICE FOR EXTENDING THE BED OF A TRANSPORT VEHICLE

[76] Inventor: Freddie W. Young, 3206 Quebec Dr., Baton Rouge, La. 70819

[21] Appl. No.: 227,507

[22] Filed: Apr. 14, 1994

[51] Int. Cl.⁶ .................................................. B60R 9/00
[52] U.S. Cl. ............... 296/26; 224/402; 224/500; 224/510; 224/521
[58] Field of Search .............. 296/26, 165; 224/42.03 R, 224/42.45 R, 42.07, 42.03 B, 42.43

[56] References Cited

U.S. PATENT DOCUMENTS

| | | | |
|---|---|---|---|
| 2,712,470 | 7/1955 | Cardini | 296/26 |
| 2,729,499 | 1/1956 | Eggum | 296/26 |
| 3,288,302 | 11/1966 | Fitzpatrick et al. | 211/41 |
| 3,300,111 | 1/1967 | Hedgepeth | 224/42.07 |
| 3,528,578 | 9/1970 | Schoenberger | 214/450 |
| 3,720,333 | 3/1973 | Vaughn | 224/42.03 B X |
| 3,730,580 | 5/1973 | Page, Jr. | 296/26 X |
| 3,877,714 | 4/1975 | Black | 280/34 |
| 4,023,850 | 6/1977 | Tillery | 296/26 |
| 4,475,760 | 10/1984 | Morgan | 296/26 |
| 4,635,835 | 1/1987 | Cole | 224/42.03 B X |
| 4,775,282 | 10/1988 | Van Vliet | 224/42.43 X |
| 4,951,991 | 8/1990 | Haigler | 296/26 |
| 5,033,662 | 7/1991 | Godin | 224/42.43 |
| 5,067,640 | 11/1991 | Gaskill | 224/42.43 X |
| 5,067,641 | 11/1991 | Johnson et al. | 224/42.43 X |
| 5,092,503 | 3/1992 | Cocks | 224/42.45 R X |
| 5,096,102 | 3/1992 | Tolson | 224/42.43 X |
| 5,232,135 | 8/1993 | Marren | 224/42.43 |
| 5,244,133 | 9/1993 | Abbott et al. | 224/42.45 R X |
| 5,267,748 | 12/1993 | Curran | 224/42.07 X |

*Primary Examiner*—Joseph D. Pape
*Attorney, Agent, or Firm*—Robert C. Tucker; William David Kiesel; Russel O. Primeaux

[57] ABSTRACT

A adjustable bed extender which is attachable to the receiver orifice of a standard receiver hitch is disclosed. The device provides support for loads which extend beyond the bed of a truck or any vehicle having a bed. The device includes a drawbar which fits into the receiver orifice of the hitch already permanently to the vehicle, a support assembly which supports the load, and an adjustable connection between the support assembly and drawbar for adjusting the height of the support assembly for different vehicle models and tailgate configuration.

9 Claims, 3 Drawing Sheets

DEVICE FOR EXTENDING THE BED OF A TRANSPORT VEHICLE

FIELD OF THE INVENTION

This invention relates, generally, to devices for extending the bed length of a vehicle that has a bed upon which items may be transported, and more particularly, to such devices which are mounted to the vehicle using the receiver of a standard receiver hitch already attached to the vehicle.

BACKGROUND OF THE INVENTION

It is often necessary to transport an item or items having a length that is greater than the bed length of the vehicle. When the items are transported, the items will extend beyond the bed of the vehicle and may be damaged during transport because of a lack of vertical support. Bat is needed is a device, attachable to the vehicle, that will provide vertical support to the items during transport. Ideally the device would be quickly and easily attached and removed from the vehicle, easily stored within the vehicle when not in use, and adapted for use with a standard receiver hitch which is already permanently attached to the vehicle.

Various attempts have been made to provide such a device. Some of the devices resulting from these attempts are described in: U.S. Pat. No. 4,023,850, issued on May 17, 1977 to Tillery; U.S. Pat. No. 4,475,760 issued on Oct. 9, 1984 to Morgan; U.S. Pat. No. 4,856,840 issued on Aug. 15, 1989 to Hanley; U.S. Pat. No. 4,932,703 issued on Jun. 12, 1990 to Chinberlin et al.; and, U.S. Pat. No. 5,116,096 issued on May 26, 1992 to Taylor. None of these devices has provided a bed extender which meets all of the above mentioned criteria.

Some of the devices are permanently attached to the vehicle and cannot be removed when not is use. Others require support from a fifth wheel or a bulky and cumbersome suspension bridge type assembly.

OBJECTS OF THE INVENTION

It is an object of the present invention to provide a bed extender which is easily attached and removed from the vehicle.

Another object of the present invention is to provide a bed extender which is easily stored when not in use.

A further object of the present invention is to provide a bed extender which is mounted to the vehicle using the receiver of a standard receiver hitch.

It is a further object of this invention to provide a bed extender which is adjustable to accommodate various vehicle models and tailgate configurations.

SUMMARY OF THE INVENTION

A device is provided for extending a vehicle bed upon which items may be transported. The device is attachable to the vehicle using the receiver of a receiver hitch already permanently attached to the vehicle. In the embodiment depicted, the device has three main components, a drawbar, a support assembly, and an adjustable connection for positioning the height of the support assembly relative to the drawbar.

In the embodiment depicted, the drawbar is a rigid L-shaped member with the long side horizontal. One end of the drawbar's long side mates with the receiver of the hitch and has a hole for retaining the drawbar in the receiver using a standard drawbar retaining pin. The other end of the drawbar's long side is attached to the lower end of the drawbar's short side. The short side of the drawbar is a hollow rigid vertical member which is the female mate to the vertical support bar of the support assembly.

The support assembly is T-shaped and is made up of a vertical support bar and a horizontal support bar. The lower end of the vertical support bar is the male mate of, and slides into, the drawbar's hollow rigid vertical member. The drawbar's hollow rigid vertical member and the vertical support bar have coaxially aligned holes which allow for vertical adjustment of the support assembly by the insertion of a pin once the desired holes have been aligned. The upper end of the vertical support bar is attached to the midpoint of the horizontal support bar with the horizontal support bar being perpendicular to both the vertical support bar and the drawbar's long side.

Completing the device are load holders which are attached to the horizontal support bar and extend vertically from it. These load holders would stop a supported load, such as pipe, from shifting off of the horizontal support bar.

DETAILED DESCRIPTION

Figure 1:
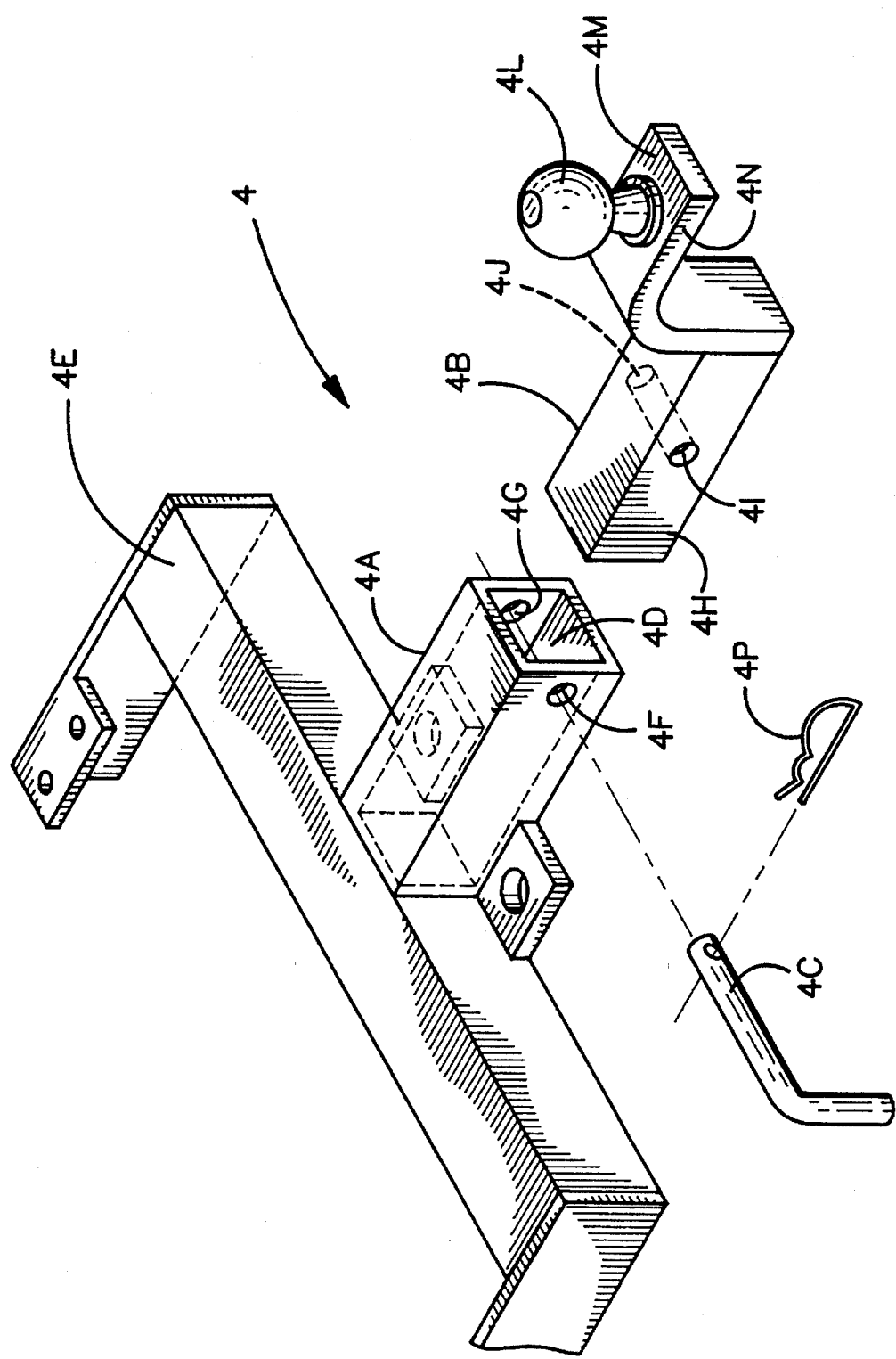
FIG. 1 is a perspective view of a standard receiver hitch with the normal trailer ball drawbar removed.

Referring to FIG. 1, a standard receiver hitch assembly, generally indicated by the numeral 4, is shown. The hitch assembly includes receiver 4A, ball unit 4B, drawbar retaining pin 4C, and retaining pin clip 4P. Receiving unit 4A includes receiver orifice 4D, mounting plate 4E, and a pair of coaxially aligned drawbar retaining pin holes 4F, 4G. Ball unit 4B includes ball unit drawbar 4K having a pair of coaxially aligned drawbar retaining pin holes 4I, 4J located at insertion end 4H and ball 4L affixed to top surface 4M at ball end 4N. When it is desired to use receiver hitch assembly 4 for towing, insertion end 4H of bail unit drawbar 4K is inserted into receiver orifice 4D, drawbar retaining pin holes 4I, 4J are brought into alignment with drawbar retaining pin holes 4F, 4G, and drawbar retaining pin 4C is inserted through the passageway formed by drawbar retaining pin holes 4F, 4I, 4J and 4G. Drawbar retaining pin clip 4P is then placed on drawbar retaining pin 4C. When receiver hitch assembly 4 is no longer needed for towing the process is reversed and ball unit 4B, drawbar retaining pin 4C, and drawbar retaining pin clip 4P can be stored.

Figure 2:
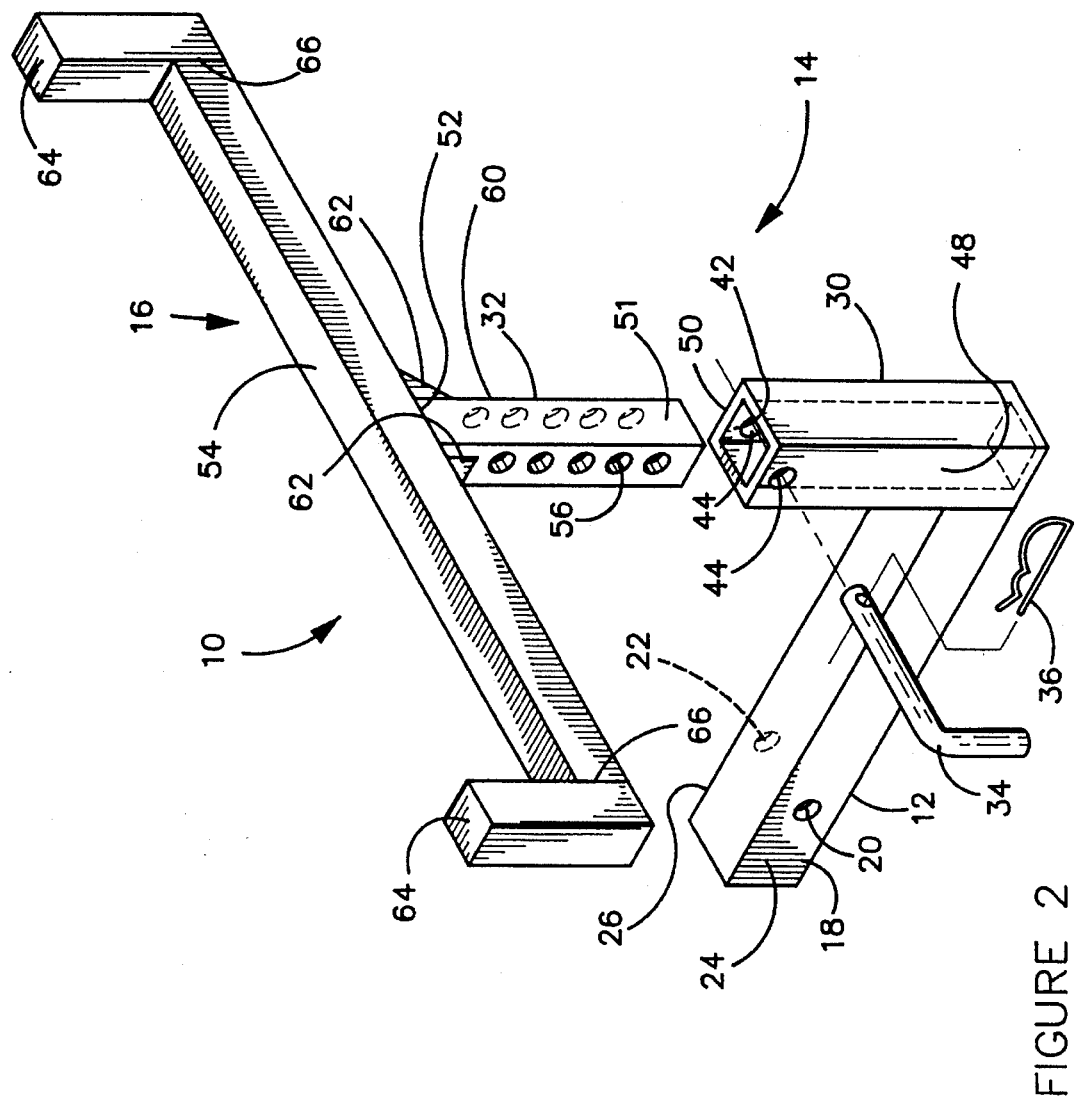
FIG. 2 is a perspective view of the invention.

Referring to FIG. 2, the invention, hereinafter referred to as the bed extender, is shown generally designated by the numeral 10. Bed extender 10 comprises a drawbar 12, a positioning means, generally indicated by the numeral 14, and a support assembly, generally indicated by the numeral 16.

Drawbar 12 may be of any desired length for application to various vehicle models and tailgate configurations. The length of drawbar 12 is of course subject to the strength of the materials from which drawbar 12 is constructed. In the embodiment depicted drawbar 12 is approximately five and one-half feet long. It is preferably constructed of two-inch by two-inch by quarter-inch square steel tubing (2"×2"¼"), which will mate with a heavy-duty type of standard receiver hitch. Although square steel tubing is the preferred material of construction, any material that can support a load at the lever arm of the desired length so as not to exceed the tongue capacity of the hitch is suitable. A smaller cross-section drawbar could be used for standard receiver hitches which are of a smaller cross-section and are for lighter applications.

Insertion end 18 of drawbar 12 is adapted to be received within receiver orifice 4D (FIG. 1) of a standard receiver hitch. Because it has been found by the inventor that the receiver orifice of a heavy-duty type of standard receiver hitch has internal dimensions slightly greater than two inches square, insertion end 18 in this embodiment does not require further adaptation in order to mate properly with receiver orifice 4D. Insertion end 18 also includes two coaxially aligned holes 20, 22 formed through two opposed sidewalls 24, 26.

As shown, positioning means 14 includes a drawbar vertical member 30, vertical support bar 32, positioning means pin 34, and a positioning means pin clip 36. In the embodiment depicted, drawbar vertical member 30 is constructed from round or polygonal rigid tubing which will mate with vertical support bar 32. First outer wall 38 of drawbar vertical member 30 is rigidly attached to tail end 40 of drawbar 12 so that the longitudinal axis of internal passageway 42 is substantially perpendicular to the axis of coaxially aligned holes 20, 22. In the embodiment shown vertical drawbar member 30 is attached to drawbar 12 by welding, but other means of rigid attachment, such as brackets or bolts, are suitable.

Drawbar vertical member 30 also includes a pair of coaxially aligned stationary holes 44 in opposed sidewalls 48, 50, for receiving positioning means pin 34, and mating with securing holes 56 of vertical support bar 32. Although in the embodiment depicted two securing holes 44 are shown, a single hole through one of opposed sidewalls 48, 50 for receiving positioning means pin 34 and mating with securing holes 56 would also be suitable. The dimensions and the shape of the cross-section of vertical support bar 32 are selected to allow lower end 51 of vertical support bar 32 to be slidably received within internal passageway 42 of drawbar vertical member 30.

Support assembly 16 consists of horizontal support bar 54 and load holders 64. Upper end 52 of vertical support bar 32 is rigidly attached to the midpoint of horizontal support bar 54 so that the longitudinal axis of horizontal support bar 54 is substantially perpendicular to both the longitudinal axis of vertical support bar 32 and the longitudinal axis of drawbar 12. In the embodiment shown vertical support bar 32 is attached to horizontal support bar 54 by welding, but other means of rigid attachment, such as brackets or bolts, are suitable.

Vertical support bar 32 includes a plurality of pairs of coaxially aligned securing holes 56 through opposed sidewalls 58, 60, for alignment with stationary holes 44 in drawbar vertical member 30 and receipt of positioning means pin 34 once the desired pair of securing holes 56 have been aligned with stationary holes 44. The depicted embodiment shows five pairs of securing holes 56, but one or more pairs could be used. Also, it is only necessary to have one or more holes through a single sidewall of vertical support bar 32 as long as the sidewall selected corresponds to the sidewall selected for use in drawbar vertical member 30. The distance between securing holes 56 can be varied for different embodiments depending on the desired degree of adjustability.

In the embodiment depicted drawbar vertical member 30 has single pair of stationary holes 44 and vertical support bar 32 has containing plurality of pairs of securing holes 56. Conversely, one could place the single pair of stationary holes on vertical support bar 32 and the plurality of pairs of securing holes on drawbar vertical member 30. In addition, although in the embodiment depicted vertical support bar 32 is slidably receivable with passageway 42 of drawbar vertical member 30, it is of course possible to reverse this relationship, or to have vertical support bar 32 immediately adjacent to, and removably bolted to, drawbar vertical member 30.

Horizontal support bar 54 is a rigid member, and in the embodiment depicted is constructed of about four feet of one-and-one-half-inch by one-and-one-half-inch by eighth-inch square steel tubing (1½"×1½"×⅛"), although various lengths and construction materials could also be used. As previously described, horizontal support bar 54 is welded at its midpoint to vertical support bar 32. In the embodiment depicted a pair of rigid triangular shaped braces 62 are attached at the joint of horizontal support bar 54 and vertical support bar 32. Braces 62 may be constructed of any rigid reinforcing material such as plate steel. Bolted angular brackets could be used instead, or there could be no bracing whatsoever.

Load holders 64 extend vertically from each end 66 of horizontal support bar 54. Load holders 64 may be constructed from steel tubing which has been welded or otherwise rigidly attached to horizontal support bar 54. Although two load holders are depicted, other embodiments could employ none, or could employ one or more load holders at various locations along horizontal support bar 54.

In the embodiment depicted, the lengths of drawbar 12, drawbar vertical member 30, and vertical support bar 32 are sized to accommodate supporting a load with the tailgate down. Other embodiments would include those in which drawbar 12 may be shortened and drawbar vertical member 30 or vertical support bar 32 lengthened so as to support loads at the height of the top of a closed tailgate or even higher.

Figure 3:
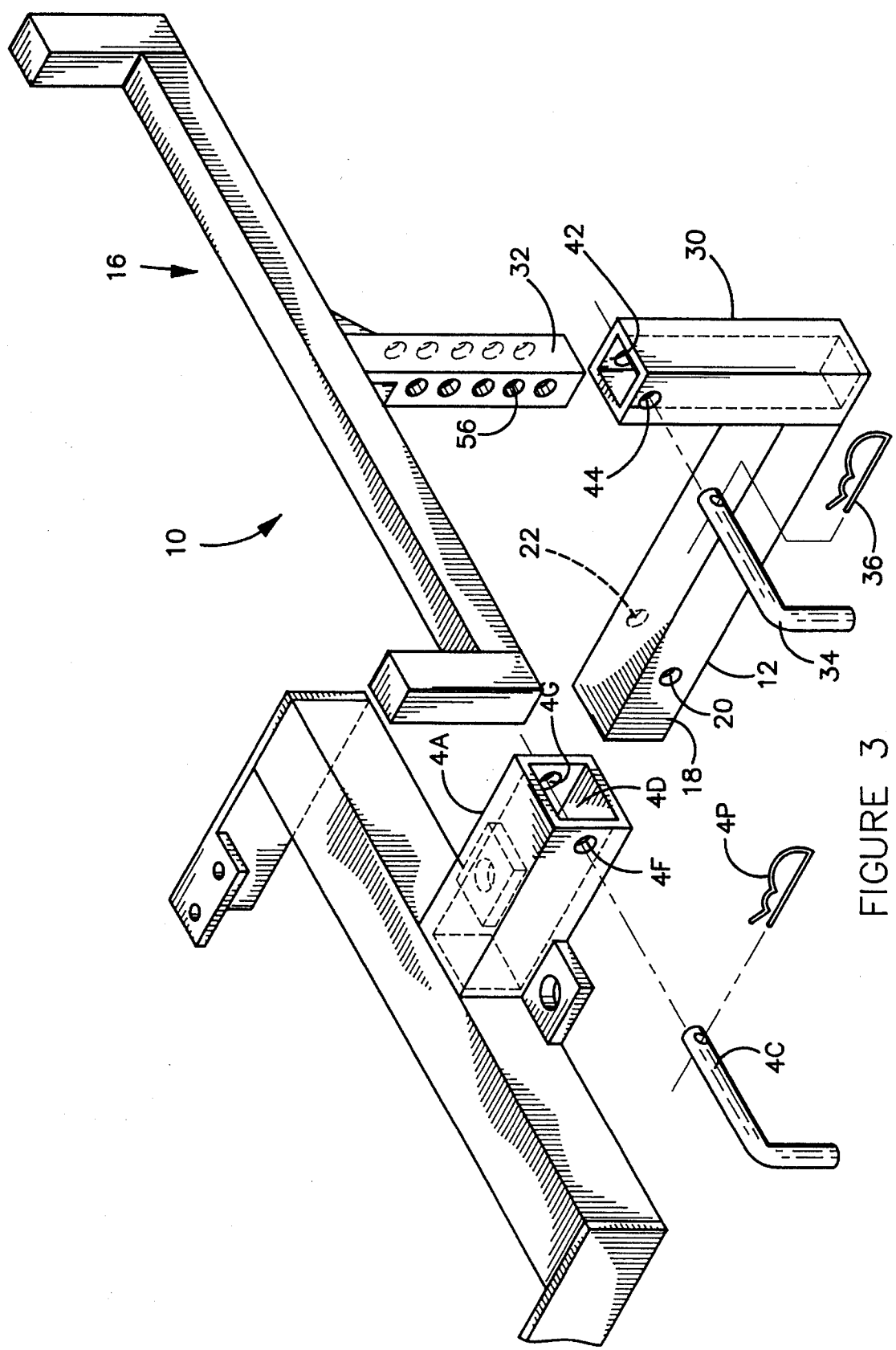
FIG. 3 is a perspective view of the invention attached to the receiver of the receiver hitch.

With reference to FIG. 3, use of the bed extender of the present invention will now be described. Bed extender 10 may be installed on any vehicle having a receiver unit 4A already attached. To install bed extender 10, insertion end 18 of drawbar 12 is inserted into receiver orifice 4D; coaxially aligned holes 20, 22 are then aligned with drawbar retaining pin holes 4F, 4G to form a passageway for receiving drawbar retaining pin 4C, and drawbar retaining pin 4C is inserted in and through the passageway. Drawbar retaining pin clip 4P is pushed into place on drawbar retaining pin 4C, locking drawbar retaining pin 4C into position.

To adjust the vertical position of support assembly 16, vertical support bar 32 is inserted into internal passageway 42 of drawbar vertical member 30. The desired position is selected by adjusting the position of vertical support bar 32 relative to drawbar vertical member 30 until the desired position is reached (usually support assembly 16 at the same height of the vehicle bed with the tailgate down) and stationary holes 44 are in alignment with a pair of securing holes 56. Positioning means pin 34 is then inserted through the passageway formed by the aligned securing holes 56 and stationary holes 44. Positioning means pin clip 36 is then attached to positioning means pin 34. Disassembly may be performed by reversing the previously described steps.

While the above description contains some specific references to materials and methods of construction, these references should not be construed as limitations on the scope of the invention, but rather as references which would allow one skilled in the art to make and use an embodiment of the device. Many variations are possible. For example, other materials of construction such as aluminum tubing and other configurations of construction materials such as rigid tubing with round or various polygonal cross-sections could be used. For the positioning means, several various means which would provide for adjustment of the position of the support assembly could be used, such as jack mechanisms or removable bolts. The adjustability feature of the positioning means could also be completely eliminated. In a fixed non-adjustable embodiment the vertical support bar would be rigidly attached to the tail end of the drawbar.

There are of course other alternate embodiments which are obvious from the foregoing descriptions of the invention which are intended to be included within the scope of the invention as defined by the following claims:

I claim:

1. A bed extender for extending the usable bed length of a truck or any other vehicle with a standard receiver hitch comprising:

a hitch connecting means for connecting said bed extender with the receiver orifice of a receiver hitch of a vehicle so that said bed extender can be completely removed from said vehicle when said bed extender is not in use;

a support means for supporting a load when said load is substantially beyond the length of said vehicle bed so that the weight of the portion of said load beyond said vehicle bed is translated to said hitch via said supporting means and said hitch connecting means;

a positioning means for attaching said hitch connecting means to said support means, said positioning means being substantially vertical, said positioning means having an upper end connected to said support means and a lower end connected to said hitch connecting means, said positioning means being of appropriate length so that said support means is at least substantially the same height as the bed of said vehicle, and said positioning means being adjustable so that the height of said support means can be adjusted relative to said receiver hitch to accommodate various vehicle models and tailgate configurations.

2. The apparatus in claim 1, wherein said supporting means further comprises a means for holding said load on said supporting means.

3. The apparatus in claim 2, wherein said hitch connecting means comprises a substantially rigid horizontal drawbar, said drawbar having an insertion end with a square cross-section appropriately sized for slidable insertion into said receiver orifice, said insertion end having two coaxially aligned holes formed through the opposed vertical sidewalls of said insertion end for operable attachment to said receiver and receipt therein of a drawbar retaining pin, and a tail end which is fixably attached to a lower end of a drawbar vertical member so that said drawbar vertical member is substantially perpendicular to said drawbar and substantially perpendicular to a line connecting said coaxially aligned holes.

4. The apparatus in claim 3, wherein said supporting means comprises a horizontal support bar which is substantially parallel to a line connecting said coaxially aligned holes in said opposed vertical sidewalls in said insertion end of said drawbar, said horizontal support bar being rigidly attached at its midpoint to the upper end of a vertical support bar, said vertical support bar being substantially perpendicular to said horizontal support bar.

5. The apparatus in claim 4, wherein said positioning means comprises said drawbar vertical member, said vertical support bar, and a support assembly pin, said drawbar vertical member and said vertical support bar appropriately sized so that the lower end of said vertical support bar may be slidably inserted into the upper end of said drawbar vertical member, said drawbar vertical member further comprising a pair of coaxially aligned stationary holes in the opposed sidewalls of said drawbar vertical member, said vertical support bar further comprising a plurality of pairs of coaxially aligned securing holes in the opposed sidewalls of said vertical support bar, said stationary holes and said securing holes sized to accommodate the insertion of said support assembly pin when a pair of said securing holes is aligned with said stationary holes after the insertion of said vertical support member into said drawbar vertical member.

6. The apparatus in claim 5, wherein said holding means comprises one or more load holders fixably attached to said horizontal support bar, said load holders being substantially perpendicular to said horizontal support bar, each said load holder having a lower end fixably attached to said horizontal support bar and an upper end extending vertically away from said horizontal support bar and being of sufficient length to prevent the shifting of a load off of said horizontal support bar.

7. The apparatus in claim 5, wherein said vertical support bar and said drawbar vertical member are formed of rigid tubing and each has a polygonal cross-section.

8. An adjustable bed extender for extending the usable bed length of a track or any other vehicle with a standard receiver hitch comprising:

a substantially rigid horizontal drawbar, said drawbar having an insertion end with a square cross-section appropriately sized for slidable insertion into the receiver orifice of a receiver hitch of a vehicle, said insertion end having two coaxially aligned holes formed through the opposed vertical sidewalls of said insertion end for operable attachment to said receiver hitch and receipt therein of a drawbar retaining pin, and a tail end which is fixably attached to a lower end of a drawbar vertical member so that said drawbar vertical member is substantially perpendicular to said drawbar and substantially perpendicular to a line connecting said coaxially aligned holes;

a horizontal support bar which is substantially parallel to a line connecting said coaxially aligned holes in said opposed vertical sidewalls in said insertion end of said drawbar, said horizontal support bar being rigidly attached at its midpoint to the upper end of a vertical support bar, said vertical support bar being substantially perpendicular to said horizontal support bar, and said vertical support bar having a lower end which can be slidably inserted into the upper end of said drawbar vertical member;

said drawbar vertical member and said vertical support bar being appropriately sized so that said lower end of said vertical support bar may be slidably inserted into said upper end of said drawbar vertical member, said drawbar vertical member further comprising a pair of coaxially aligned stationary holes in the opposed sidewalls of said drawbar vertical member, said vertical support bar further comprising a plurality of pairs of coaxially aligned securing holes in the opposed sidewalls of said vertical support bar, said stationary holes and said securing holes sized to accommodate the insertion of a support assembly pin when a pair of said securing holes is aligned with said stationary holes after the insertion of said vertical support member into said drawbar vertical member.

9. The apparatus in claim 8, wherein said horizontal support bar further comprises one or more load holders fixably attached to said horizontal support bar, said load holders being substantially perpendicular to said horizontal support bar, each said load holder having a lower end fixably attached to said horizontal support bar and an upper end extending vertically away from said horizontal support bar and being of sufficient length to prevent the shifting of a load off of said horizontal support bar.

* * * * *